United States Patent [19]

Kelley et al.

[11] 3,960,987

[45] June 1, 1976

[54] PROCESS FOR PRODUCING HIGH MELT FLOW POLY-OLEFIN POLYMERS

[75] Inventors: Joseph M. Kelley, Westfield; John J. Miskel, Jr., Mendham, both of N.J.

[73] Assignee: Dart Industries Inc., Los Angeles, Calif.

[22] Filed: Sept. 23, 1974

[21] Appl. No.: 508,137

Related U.S. Application Data

[63] Continuation-in-part of Ser. No. 376,264, July 3, 1973, abandoned, which is a continuation of Ser. No. 684,594, Nov. 13, 1967, abandoned, which is a continuation-in-part of Ser. No. 369,417, May 22, 1964, abandoned.

[52] U.S. Cl. ............................................. 260/878 B
[51] Int. Cl.² ...................... C08F 2/02; C08F 2/06; C08F 2/38; C08F 297/08
[58] Field of Search ................................ 260/878 B

[56] References Cited
UNITED STATES PATENTS

| | | | |
|---|---|---|---|
| 3,051,690 | 8/1962 | Vandenberg | 260/93.7 |
| 3,193,360 | 7/1965 | Scoggin | 260/93.7 |
| 3,301,921 | 1/1967 | Short | 260/878 B |
| 3,318,976 | 5/1967 | Short | 260/878 B |
| 3,378,607 | 4/1968 | Jones et al. | 260/878 B |
| 3,514,501 | 5/1970 | Leibson et al. | 260/878 B |

*Primary Examiner*—Alan Holler
*Attorney, Agent, or Firm*—Arthur S. Collins; Bryant W. Brennan; Fred S. Valles

[57] ABSTRACT

Propylene, for example, is polymerized with crystalline $TiCl_3$—$AlCl_3$ and diethylaluminum monochloride catalyst at a rate of at least 300 lbs. polymer/lb. catalyst/hr. based on $TiCl_3$ with partial $H_2$ pressure of about 150 to about 1000 psi and sufficient total pressure to maintain propylene in liquid form. The resulting propylene homopolymer, while still containing active catalyst residues, is then reacted further with at least one additional alpha-olefin, preferably ethylene or ethylene-containing alpha-olefin mixtures in suitable amounts. The resulting waxy block copolymer has a melt flow of 40 to 400 as determined by ASTM-D-1238-62T at 230°C.

3 Claims, 1 Drawing Figure

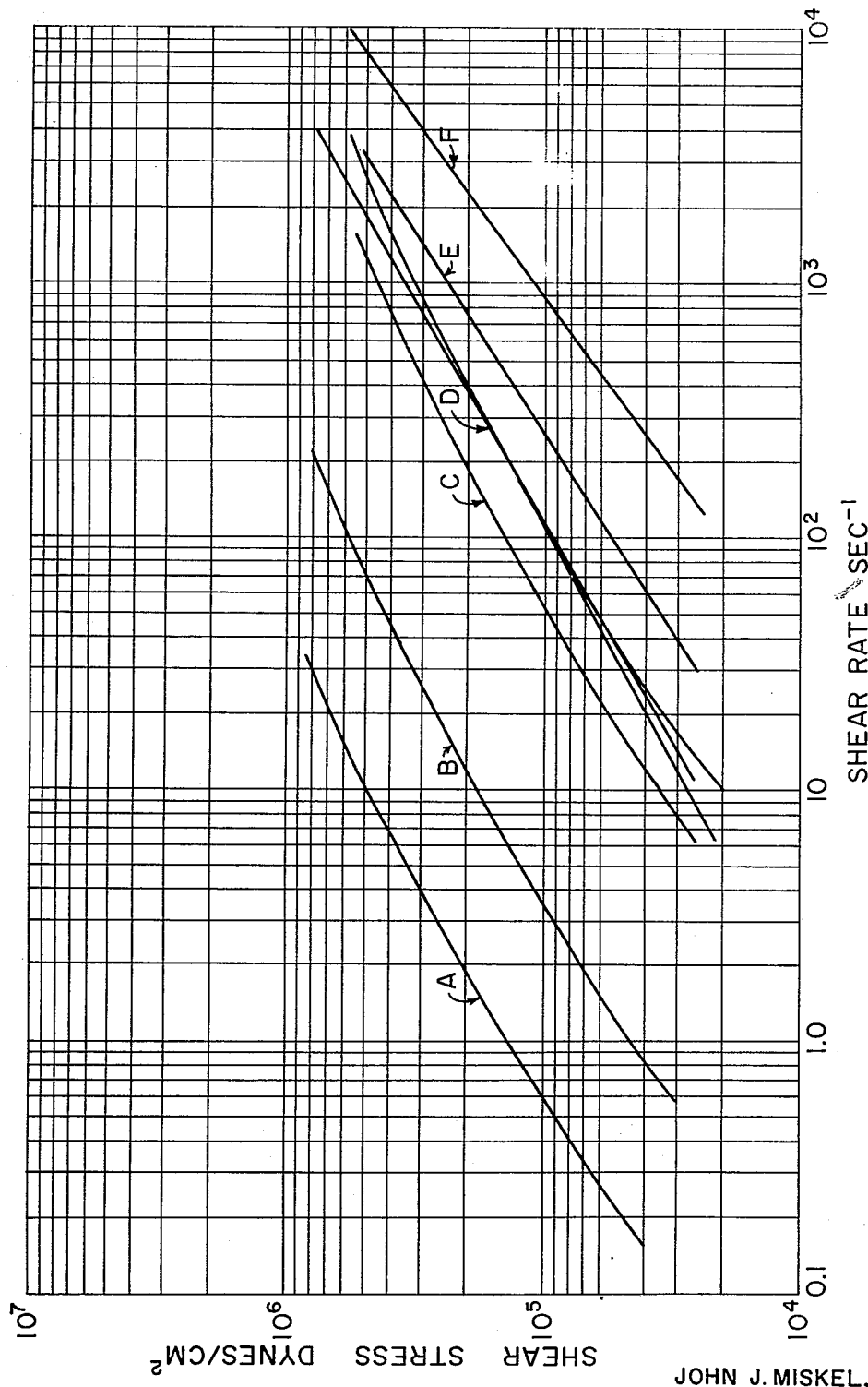

PROCESS FOR PRODUCING HIGH MELT FLOW POLY-OLEFIN POLYMERS

CROSS-REFERENCE TO RELATED APPLICATION

This application is a continuation-in-part of pending application Ser. No. 376,264, filed July 3, 1973, now abandoned, which is a continuation of abandoned application Ser. No. 684,594, filed Nov. 13, 1967, which in turn is a continuation-in-part of abandoned application Ser. No. 369,417, filed May 22, 1964, the subject matter of each is incorporated by reference.

BACKGROUND OF INVENTION

1. Field of Invention

This invention concerns a process for preparing high melt flow polymers of alpha-olefins containing at least 3 carbon atoms, to copolymers thereof and to certain copolymer compositions which are believed to be new. The process, the operating conditions and physical properties of these polymers will be described fully hereinafter in the specification.

2. DESCRIPTION OF PRIOR ART

Alpha-olefin polymers, specifically those of propylene have been prepared heretofore in normally liquid hydrocarbon diluents employing what has become known to the art as Natta-Ziegler catalysts. High molecular weight polypropylenes of inherent viscosities ranging from about 1.5 to 18 as measured in decalin at 135°C have heretofore been prepared by these techniques, specifically those wherein a titanium trihalide and an aluminum alkyl was used as a catalyst. The propylene polymers of inherent viscosities of about 5 and higher are usually of very high molecular weights and in order to be able to extrude or mold such polymers, it is usually required that the molecular weight be reduced for greater operational efficiency. An excellent means for accomplishing this reduction in molecular weight is disclosed in Vandenburg U.S. Pat. No. 3,051,690 of Aug. 28, 1962, which describes in some detail a method for employing hydrogen to control molecular weight of alpha-olefin polymers such as ethylene, propylene and higher. The patent discloses that polymers from ethylene and up to dodecene-1 and including branched chain alpha-olefins, as well as copolymers of the foregoing can be prepared using hydrogen to control the molecular weight while using normally liquid-hydrocarbon diluents such as heptane or hexane and as catalysts the hydrocarbon insoluble reaction product formed by contacting titanium tetrachloride with an aluminum alkyl compound and further activating this with an aluminum alkyl. The reaction pressures disclosed in the examples of this patent are nominal pressures, that is, below about 100 psig, even though higher or lower pressures, according to the specification, can be used. With respect to hydrogen pressures employed in propylene polymerizations, the examples indicate low pressures, and the preparation of propylene polymers of reduced specific viscosities (RSV) of from 3.7 to 0.8 for the heptane-insoluble fraction.

In most polymerization reactions wherein it is desired to control the molecular weight of the alpha-olefin polymer formed, it is indeed satisfactory to employ low hydrogen pressures, especially propylene polymerizations, since adequate control of molecular weight can be obtained, as illustrated in the above patent. Where high hydrogen pressures are used in propylene polymerizations wherein normally liquid hydrocarbons are used as diluents in the polymerization reactions, the prior art reports a decrease in polymerization rates (see British Pat. No. 908,101). It is not surprising therefore that even the Vandenberg patent admonishes against the use of high hydrogen pressures, for example pressures not to exceed about 185 psig (200 psia), since according to the teachings of that patent, extensive hydrogenation of the monomer can occur at these high pressures. The low conversion rates obtained by employing hydrogen as a molecular weight control agent where normally liquid hydrocarbon diluents are employed in these prior art reactions are also illustrated in the various examples of this patent showing conversion of propylene to polypropylene. Hydrogenation of the polymerizable monomer would readily result in low polymerization rates as might be expressed in pounds of polymer produced per pound of catalyst per hour.

In order to further illustrate the state of the prior art concerning the use of high hydrogen pressures, British patent 908,101, cited above, is discussed in more detail here since it strikingly illustrates that the use of too much hydrogen or too high a hydrogen pressure results in reduced polymerization rates In Example 5 of that specification it is illustrated for example that where an autoclave is pressurized with 7.0 psi hydrogen and a polymerization of propylene is carried out in dry petroleum ether there results a yield of 99 grams of polypropylene during a 28 hour reaction period. The catalyst disclosed for this example is a titanium trichloride aluminum chloride complex activated with diethylaluminum chloride. Thus, the rate of polymerization to produce a polymer having a melt viscosity (at 190°C) of $1.9 \times 10^3$ poises is somewhat less than 4 grams of polymer per gram of catalyst per hour. The statement in this specification, therefore, that high hydrogen pressures result in reduced rates and yields of polymer is substantially verified.

From the foregoing general state of the art, it may be concluded, therefore, that high hydrogen pressures in the polymerization of propylene and higher alpha-olefins results in reduced polymerization rates and low polymer yields and/or hydrogenation of the monomer at high hydrogen pressures leading to the same result. High melt flow propylene polymers, for example, higher than those illustrated in Example 5 of British Pat. No. 908,101 would seem difficult, if not substantially impossible to prepare at an economical rate in view of the teachings of the art. It is not surprising, therefore, in view of the above, that in U.S. Pat. No. 2,835,659, May 20, 1958, there is described a method for preparing extremely high melt flow polymers of propylene by a technique other than a direct polymerization reaction. This patent disclosed that ". . . it was not possible to polymerize propylene to form waxy polymers directly, since the major part of the low molecular weight polypropylene having a molecular weight in the range of 1,000 to 8,000 was an oily or a rubbery semi-solid similar to the polymers prepared using either Friedel-Crafts or free radical catalysts."

The process for preparing waxy polymers, therefore, according to the patent is to employ a prepolymerized high molecular weight isotactic polypropylene (prepared by using a catalyst such as disclosed in Belgian Pat. No. 538,782) and heat it at 300° to 450°C in the absence of air to result in a wax characterized by having an inherent viscosity in tetralin at 145°C of 0.5 or less. The polypropylene waxes prepared according to this technique possess crystallinities equal to or greater than those of the original high molecular weight polymer employed in the process according to this teaching. The new waxes are indicated as useful for coatings or for the preparation of emulsifiable polypropylene waxes according to U.S. Pat. No. 2,828,296.

SUMMARY OF THE INVENTION

It is an object of this invention to prepare alpha-olefin copolymers of high melt flows by direct copolymerization reactions.

A further object of this invention is the preparation of novel block copolymers of polypropylene with ethylenically unsaturated monomers which are characterized by high melt flows and are useful in the areas indicated hereinafter.

The objects as stated above are accomplished by a process for preparing a hydrocarbon polymer of an alpha-olefin containing at least 3 carbon atoms having an inherent viscosity of from 0.05 to 0.7 in decalin at 145°C (melt flows of from 1000 to 5000 at 230°C) which process comprises polymerizing said alpha-olefin monomer in liquid form while employing a catalyst comprising titanium trichloride and an aluminum alkyl in the presence of hydrogen, the hydrogen pressure being maintained at a partial pressure of about 300 psi and up to about 1000 psi, the total pressure of the reaction vessel being sufficient to maintain the monomer in liquid form during said polymerization. The resulting homopolymer is then reacted with another alpha-olefin to form a post block segment thereon. The preferred melt flows of the resultant block copolymers produced herein range from 40 to 400.

The process of this invention produces low molecular weight polymers at high polymerization rates directly in the polymerization reaction vessel when high hydrogen pressures are uses, such rates running from about 300 to as high as 500 lbs. and higher of polymer per hour per pound of titanium trichloride (of Example 5 of British Pat. No. 908,101). These high polymerization rates in the presence of high hydrogen pressures generally equal or exceed presently known rates rates for the preparation of high molecular weight homopolymers employing Natta-Ziegler catalysts.

The polymerization process for preparing high melt flow polymers of this invention as stated briefly above encompasses preferred embodiments, which preferred embodiments result in the preparation of homopolymers of melt flows (ASTM D-1238-62T at 230°C unless otherwise noted and 2160 gram load) ranging from a low of about 1000 to over 5000 and densities ranging from 0.90 to 0.92, preferably 0.903 to 0.913, and a melting point range of 140° to 170°C, while still retaining crystallinity of the polymer. Thus, while in U.S. Pat. No. 2,835,659, polypropylene polymers of melt flows of over 1000 are prepared by heating a high molecular weight isotactic polypropylene in the absence of air to obtain crystalline or isotactic low molecular weight polymers, the process herein accomplishes this result by going directly from the monomer to the low molecular weight material, retaining all the crystalline characteristics of the polymer, but eliminating the thermal cracking step required by the cited patent. Homopolymers and block copolymers of polypropylene of melt flows ranging from 10 and up to 400 are useful as extrusion coating resins, while those of melt flows of around 400 to 5000 are useful in melt coating processes as illustrated in U.S. Pat. No. 3,106,485.

BRIEF DESCRIPTION OF THE DRAWING

The attached drawing, which illustrates shear stress over shear rate curves for the high melt flow polymers of this invention depicts the products prepared herein compared with some commercially known polymers for use as extrusion coating resins. Reference will be made to this drawing hereinafter.

PREFERRED EMBODIMENT OF THIS INVENTION

It is important in one embodiment of this invention that the process be carried out employing the monomer in liquid form. For propylene and higher alpha-olefins to which this process is applicable, a minimum pressure excluding that of the hydrogen in the order of about 75 psia (at about room temperature) and can range as high as 5000 psia. Since the hydrogen pressures employed in this embodiment of the invention are a minimum of 40 psia, the total reactor pressures, therefore, will run from 115 psia at room temperature to the upper limit mentioned above. Adequate pressures for a variety of a high melt flow polymers, according to the technique herein, are hydrogen pressures of from 40 to 1000 psia, preferably 300 to 1000 psia. Using these hydrogen pressures, low molecular weight polypropylenes have been prepared with melt flows of about 5,000 at polymerization rates of up to 550 pounds per hour per pound of $TiCl_3$. Thus, using a hydrogen pressure of from 150 to 500 psi, polypropylene and propylene-ethylene copolymers having melt flows of over 500 can be readily prepared.

While it has been indicated that the monomer should preferably be used in liquid form by employing suitable pressures for this purpose, the process does not exclude the use of small amounts of normally gaseous hydrocarbon diluents such as propane or butane, which can be liquefied similarly to propylene. The preferred process, however, is the use of the monomer without extraneous diluents in liquid form, since it has been found that extremely high polymerization rates are obtained at high hydrogen pressures, contrary to what might have been expected in view of the teachings of the prior art.

The monomers applicable to the process herein as mentioned above are propylene, butene-1, pentene-1 and higher, for example, up to dodecene-1 (generally those of from 3 to 10 carbon atoms), as well as branched chain 1-olefins such as 4- and 5-methyl heptene-1, 4-methyl pentene-1, 3-methyl butene-1 and the like, including copolymers of the foregoing and copolymers with ethylene in minor amounts, that is, from about 2 to 30 percent. In those copolymerization reactions involving ethylene, this monomer is introduced dissolved in the other liquid monomer or is dissolved in the reactor in said liquid monomer.

The block copolymers (modified polypropylene) prepared according to the process of this invention are those that result from the use of a polymerized alpha-olefin of from 3 to 10 carbon atoms to obtain first a solid crystalline homopolymer characterized by a melt flow of from 1000 to 5000. The crystalline homopolymer while still containing active catalyst residues is reacted further with one, two or more alpha-olefins containing from 2 to 10 carbon atoms until there is polymerized onto the homopolymer from about 2 to 40 percent by weight of the alpha-olefin(s), preferably from about 5 to 30 percent. The resulting block copolymers by which is understood a crystalline homopolymer of an alpha-olefin to which there is attached at one end thereof a crystalline block of another alpha-olefin or a random copolymer of two or more alpha-olefins are unique in that they possess very high melt flows. The block copolymers which in the preferred embodiment of this invention consist of polypropylene containing attached thereto an ethylene homopolymer, a butene-1 homopolymer or a random copolymer of ethylene-propylene, ethylene-butene-1, or propylene-butene-1, have melt flows ranging from 40 to 400, densities of from about 0.90 to 0.92 and melting points ranging from about 160° to 170°C. These block copolymers are believed to be new since heretofore it had not been possible, according to the prior art, to prepare high melt flow homopolymers by a direct polymerization reaction. For the purpose of this invention by high melt flow polymers is meant those having a melt flow, according to the ASTM designation above 40 and preferably 40 to 400 and useful as extrusion coating resins. The block copolymerization is preferably carried out in the vapor phase, but other methods can also be used. The novel block copolymers are useful as extrusion coating resins and the like.

The preferred catalyst for carrying out the polymerization reactions according to the process herein are titanium trichlorides, specifically those containing co-crystallized therein, (in solid solution) aluminum chloride. Catalyst compositions according to this invention are $TiCl_3 \cdot nAlCl_3$, wherein $n$ is a number of from 0.1 to 1.0 (referred to hereinafter simply as $TiCl_3$). Such composition can be prepared by the reduction of titanium tetrachloride with metallic aluminum according to U.S. Pat. No. 3,032,510. Where such a catalyst is prepared and is then activated by grinding in a dry inert atmosphere there is obtained a very active catalyst which can be further activated with an aluminum alkyl compound such as diethylaluminum monochloride, aluminum triethyl, diisobutylaluminum chloride, diethylaluminum iodide and the like. Catalysts formed from mixtures of these components are extremely active in the polymerization of alpha-olefins as heretofore known in the art. The amounts of these catalysts used should be sufficient to cause the polymerization of the alpha-olefins and can range from 0.01 to 0.5 percent by weight with an aluminum/titanium ratio of 0.5 to 20.

EXAMPLES

The following general procedure was used in the preparation of the homopolymers illustrated in Table I below, Runs 1 through 4.

To a previously clean and dried 1.0 liter autoclave containing a dry nitrogen atmosphere was added 0.13 grams $TiCl_3$, and sufficient diethylaluminum monochloride to give a final Al/Ti ratio of 2:1. The autoclave was then heated to 55°C, the pressure adjusted to 25 psig and the required partial pressure of hydrogen metered. To this was then added 400 cc of liquid propylene and the reaction run for two hours at 65°C.

Table I

| Run No. | Hydrogen Pressure, psi | Reactor Heptane-Insolubles* | Melt Flow gm/10 min. | Activity lb/hr/lb $TiCl_3$ | Density Grams/cc |
|---|---|---|---|---|---|
| 1 | 33.0 | 83.2 | 46 | 565 | 0.908 |
| 2 | 60.0 | 79.9 | 220 | 585 | — |
| 3 | 80.0 | 83.6 | 440 | 527 | — |
| 4 | 150.0 | 65.6 | 1100 | 535 | — |

Conditions: Al/Ti - 2:1, 65°C - 2 hours

*Actually a substantial amount of the heptane soluble polymer was of the isotactic structure, but because of its low molecular weight, it was readily extracted with boiling n-heptane.

It will be noted from the foregoing that excellent homopolymers of melt flows in grams per 10 minutes of from 46 to 1100 can be prepared at extremely high polymerization rates. Reference will be made to these polymers with respect to the shear stress, shear rate curves hereinafter. It should be noted that the crystallinity of the polymers as expressed in heptane insolubles is also high, indicating therefore that the fact that they are produced with such high melt flow characteristics does not detrimentally affect the crystallinity of the polymer.

Polymers in the wax range as set forth in U.S. Pat. No. 2,835,659 are illustrated in Table II below in Runs number 5 and 6. In Run No. 6 in the Table below, it will be seen that at 500 psi hydrogen pressure, the high catalyst activity or polymerization rate of 390 pounds per hour per pound of catalyst ($TiCl_3$) was obtained. The higher melt flow for Run No. 5 using less hydrogen pressure was due to better hydrogen dispersion in the liquid monomer (faster stirring rate than in Run No. 6).

TABLE II

| Run No. | 5 | 6 |
|---|---|---|
| Melt Flow — 190°C, gm/10 min. | 1700 | 1050 |
| Melt Flow — 230°C, gm/10 min. | 5000 | 2500 |
| $H_2$ Pressure, psi | 400 | 500 |
| Inherent Viscosity* | 0.45 | 0.53 |
| Activity — lb/hr/lb $TiCl_3$ | 438 | 390 |
| Density, gms/cc | .907 | .907 |
| Melting Point, °C | — | 162–168 |

*Inherent viscosity determined at 145°C in Decalin

In Run No.7, Table III, below, the procedure used for polymerization was similar to the homopolymerization except that a mixture of ethylene dissolved in liquid propylene was continuously fed to the reactor at such a rate to give the desired incorporation.

TABLE III

| | Random Ethylene-Propylene Copolymer |
|---|---|
| Run No. | 7 |
| Hydrogen, psi | 150 |
| Calc. wt. % ethylene | 3.9 |
| Low Temp. Brittleness, °C | +25 |
| Izod | To Brittle to Run |
| Stiffness, psi | 174,000 |
| Melt Flow, 230°C | 500 |
| Density, grams/cc | 0.904 |
| Melting Point, °C | 142–147 |

Table IV below illustrates the preparation of block copolymers using preformed polypropylene homopolymers of high melt flows.

Post Ethylene Block Preparation

To a thoroughly clean and dry stirred 1.0 liter autoclave under a nitrogen atmosphere was added 0.13 grams of $TiCl_3$, and 2 cc of 0.66 molar diethylaluminum chloride in purified normal heptane. This was followed by pressuring up the autoclave with the required amount of hydrogen at 55°C and then adding 400 cc of liquefied propylene. The reaction was then run at 65°C for two hours. At the end of this period the reaction was vented to 0 psig, then pure ethylene was metered in at the rate of 1.0 liter/minute, at 65°C, for 45 minutes at a pressure of 5 psig with a constant vent gas.

Post Ethylene-Propylene Block Preparation

The homopolymerization was run as described above. Block copolymerization was accomplished by venting the reactor to 35 psig of propylene and then metering ethylene at 0.5 liter/minute, at 35 psig and 65°C for 30 minutes with a constant vent gas.

TABLE IV

| Post Ethylene Run No. | 8 | 9 |
| --- | --- | --- |
| Homopolymer melt flow | 1000 (150 psi H$_2$) | 150–200 (60 psi H$_2$) |
| Copolymer melt flow | 300 | 40 |
| % Ethylene Incorporation | 2.1 | 7.4 |
| Block Polymerization Temp./Time/Pressure | 65°C/45 min/5 psig | 65°C/45 min/5 psig |
| Melting Point, °C | 163–165 | 166–168 |
| Density, grams/cc | 0.906 | 0.911 |

| Post Ethylene-Propylene Run No. | 10 | 11 |
| --- | --- | --- |
| Homopolymer Melt Flow | 1000 (150 psi H$_2$) | 150–200 (60 psi H$_2$) |
| Copolymer Melt Flow | 44 | 13 |
| % Ethylene Incorporation | 6.5 | 7.1 |
| Block Polymerization Tem./Time/Pressure | 65°C/30 min/35 psig | 65°C/30 min/35/psig |
| Melting Point, °C | 162–165 | 166–168 |
| Density, grams/cc | 0.912 | 0.913 |

The foregoing runs illustrate the preparation of homopolymers of propylene of high melt flow and high crystallinity which are useful for the purposes heretofore indicated. The block copolymerization of homopolymers of propylene of melt flows of 1,000 is also illustrated in Runs number 8 and 10 to result in block copolymers having melt flows of over 40 and up to 300. The random ethylene-propylene copolymer of Run No. 7 illustrates an unusually high stiffness value for a copolymer of this type having the melt flow indicated.

The attached drawing illustrates melt flow curves for some commercially available polypropylenes and those prepared according to the process herein obtained with a standard CIL High Shear Viscometer (Canadian Industries, Ltd., Standard Model HSV-1) at a temperature of 190°C, a standard die, and a length to diameter ratio of 20. Melt flow studies of this nature are useful in indicating processability of a polymer in commercial fabricating equipment. The curves A through F in the drawing indicate excellent processability characteristics of these polymers in the range of shear stress forces tested (no melt fractures occuring). Curves A through D indicated polymers of melt flows ranging from about 1.0, 18, 60 and 190 to 200 for the series of curves grouped as D respectively; curves E and F indicate polymers of melt flows ranging from 440 to 1100 respectively and represent Runs 3 and 4 of Table I.

Resort may be had to modifications of this process which do not depart from the scope of the invention and the appended claims.

What is claimed is:

1. A polymerization process for preparing a waxy block copolymer of propylene which consists essentially in polymerizing (said) propylene in liquid form employing as a catalyst a crystalline titanium trichloride cocrystallized with aluminum chloride and diethylaluminum monochloride as a cocatalyst, said polymerization being carried out at a rate of at least 300 pounds of polymer per pound of catalyst per hour based on the titanium trichloride and in the presence of a hydrogen partial pressure of about (300) 150 psia to about 1000 psia and at a reaction pressure of about 375 psia to about 5000 psia sufficient to maintain said propylene in liquid form during said polymerization to produce a homopolymer having an inherent viscosity of from 0.05 to 0.7 in decalin at 145°C and a melt flow of from 1000 to 5000 gms/10 min. as determined by ASTM D-1238-62T at 230°C using a load of 2160 grams, contacting said homopolymer which still contains active catalyst residues with at least one additional alpha-olefin monomer to form a subsequent polymer block attached to said homopolymer selected from the group of polyethylene (or) and a random ethylene-propylene copolymer and recovering from said polymerization a waxy block copolymer having a melt flow ranging from 40 to 400 gms/10 min. as determined by ASTM-D-1238-62T at 230°C using a load of 2160 grams.

2. An extrusion coating waxy block copolymer composition comprising a homopolymer of propylene having an intrinsic viscosity of from 0.05 to 0.7 in decalin at 145°C and a melt flow of from 1000 to 5000 (pms) gms/10 min. as determined by ASTM-D-1238-62T at 230°C using a load of 2160 grams, having polymerized thereon from about 2 to 40 weight percent of at least one additional monomer selected from the group of ethylene (or) and a mixture of ethylene and propylene, said block copolymer being characterized by having a melt flow ranging from 40 to 400 gms/10 min. as determined by ASTM-D-1238-62T at 230°C using a load of 2160 grams, a density of from 0.90 to 0.92 and a melting point of from about 160° to 170°C.

3. The process of claim 1 wherein said initial polymerization to produce said homopolymer is conducted in the absence of substantial amounts of extraneous diluents in liquid form.

* * * * *

UNITED STATES PATENT AND TRADEMARK OFFICE
CERTIFICATE OF CORRECTION

PATENT NO. : 3,960,987
DATED : June 1, 1976
INVENTOR(S) : Joseph M. Kelley and John J. Miskel, Jr.

It is certified that error appears in the above-identified patent and that said Letters Patent are hereby corrected as shown below:

Column 5, Table I - insert "1" in the first line of the table under the heading "Run No."

Column 7, line 54, Claim 1 - after "polymerizing" delete "(said)"

Column 8, line 23, Claim 1 - after "about" delete "(300)"

Column 8, line 35, Claim 1 - after "lene" delete "(or)"

Column 8, line 43, Claim 2 - after "5000" delete "(pms)"

Column 8, line 48, Claim 2 - after "ethylene" delete "(or)"

Signed and Sealed this

Thirty-first Day of August 1976

[SEAL]

Attest:

RUTH C. MASON
*Attesting Officer*

C. MARSHALL DANN
*Commissioner of Patents and Trademarks*